United States Patent [19]

Rubin

[11] 4,067,771

[45] Jan. 10, 1978

[54] NUCLEAR REACTOR CONTAINMENT SPRAY TESTING SYSTEM

[75] Inventor: Kenneth Rubin, Pittsburgh, Pa.

[73] Assignee: Westinghouse Electric Corporation, Pittsburgh, Pa.

[21] Appl. No.: 679,293

[22] Filed: Apr. 22, 1976

[51] Int. Cl.² .............................................. G21C 17/00
[52] U.S. Cl. ..................................... 176/19 R; 176/38; 250/338
[58] Field of Search .............................. 176/19, 37, 38; 250/330, 332, 338– 343, 347–353; 73/15 R, 15 FD, 37

[56] References Cited

U.S. PATENT DOCUMENTS

| 2,816,233 | 12/1957 | Krueger | 250/338 |
| 3,528,884 | 9/1970 | Collier et al. | 176/37 |
| 3,635,085 | 1/1972 | Shimotsuma et al. | 250/330 |
| 3,736,790 | 6/1973 | Pontello | 73/37 |
| 3,791,194 | 2/1974 | Pontello | 73/15 FD |
| 3,854,821 | 12/1974 | Thompson | 250/341 |

Primary Examiner—Samuel W. Engle
Assistant Examiner—S. A. Cangialosi
Attorney, Agent, or Firm—Edward L. Levine; Z. L. Dermer

[57] ABSTRACT

A method for periodic testing of a spray system in a nuclear reactor containment. The method includes injecting a gas into the spray system such that a temperature differential exists between the gas and the containment atmosphere. Scanning the gas jet discharged from the spray nozzles with infrared apparatus then provides a real-time thermal image on a monitor, such as a cathode ray tube, and detects any partially or completely blocked nozzles in the spray system. The scanning may be performed from the containment operating deck.

1 Claim, 4 Drawing Figures

NUCLEAR REACTOR CONTAINMENT SPRAY TESTING SYSTEM

BACKGROUND OF THE INVENTION

1. Field of the Invention

This invention provides a method for testing the containment spray system of a nuclear reactor.

2. Description of the Prior Art

Among the auxiliary systems comprising the safeguard systems of a nuclear reactor facility is a containment spray system. In the event of an accident causing reactor coolant to flow out of the primary reactor system, the containment spray system will operate to deluge the primary components with a mixture of water and a neutron absorber. The containment spray system typically comprises a large amount of spray conduits containing spray nozzles, located in the upper portion of the containment structure. Safety requirements dictate that this system must be tested prior to initial plant operation as well as at periodic intervals during the plant life.

To date no system exists which accurately and simply can be used to perform the necessary testing. Further, none of the prior art systems contain means for actual physical recording of the test. Presently used techniques are based upon the principle that the testing of the containment spray system is satisfactory if air flow or smoke through the spray nozzles indicates that the nozzles are not plugged. Prior art designs, therefore, fall into two categories. The first consists of a smoke test wherein smoke is injected into the system and is observed to flow out of the spray nozzles. The second system comprises using a helium filled balloon suspended at the nozzles whereby the motion of the balloon is observed when air flow is introduced into the spray system. Each of these prior art methods has significant drawbacks.

The main problem with the smoke test is that smoke injected into the spray system quickly fills the containment atmosphere with the smoke thereby obscuring the nozzles. Secondly, particulates are added to the containment atmosphere, by the smoke, which causes an undesirable loading of the containment filtration systems. These factors therefore require that the smoke test be run in intervals, which is both time consuming and costly. A small number of nozzles are observed during an interval, and the test is then stopped to clear the containment of smoke before testing is restarted. The balloon test is also costly in terms of time requirements and at best gives a relatively crude test of the operability of the spray system. This test is performed either from the operating deck, which is typically greater than a hundred feet below the elevation of the spray system, or from scaffolding erected at that high elevation. If performed from the operating deck, control and observation of any movement of the balloon is very difficult. If performed from scaffolding, the test is expensive in terms of erection time, as well as a high risk factor for personnel who must operate on the scaffolding. The balloon test is also very susceptible to air currents within the containment. Personnel controlling the balloon at the operating deck level are also susceptible to radiation exposure. Prior balloon tests required two to three days for completion, and could not be performed concurrently with the refueling operation, as the testing personnel may interfere with refueling personnel. A smoke test requires at least as much time as the balloon test.

The time and safety problems associated with prior testing systems are eliminated by this invention. Further, the invention provides means for accurate recording of the test.

SUMMARY OF THE INVENTION

This invention provides a simple and accurate means for testing a containment spray system in the containment structure of a nuclear reactor plant. The system is primarily based upon the ability of existing infrared apparatus to accurately detect thermal differentials in a medium such as air. In the main embodiment, the system comprises injecting a gas, such as air, into the containment spray system conduits at a temperature below the temperature of the containment ambient atmosphere. This cold gas then flows through the piping of the spray system, and into the containment atmosphere through the spray nozzles. By scanning the nozzles with an infrared camera device, a thermal pattern, representing the flow of the cold gas into the containment atmosphere, can be obtained. Connecting the infrared camera device to a monitor such as a cathode ray tube produces a real time thermal image which can be recorded on video tape or still photographic film, and which also may be observed by testing personnel. A plugged nozzle will show no gas jet exiting the nozzle. A partially obstructed nozzle will show a smaller and distorted gas jet. A comparison of the pattern of exit from each nozzle with the majority of patterns from all the nozzles provides an accurate indication of any partially or completely blocked nozzles. The time required to scan and test all the nozzles of a containment spray system, including set up time, should be less than 1 day. Further, the scanning device can be set at almost any point in the containment structure, thereby avoiding interference with refueling or other maintenance personnel, and minimizing radiation exposure to those performing the test.

DESCRIPTION OF THE PREFERRED EMBODIMENTS

Figure 1:
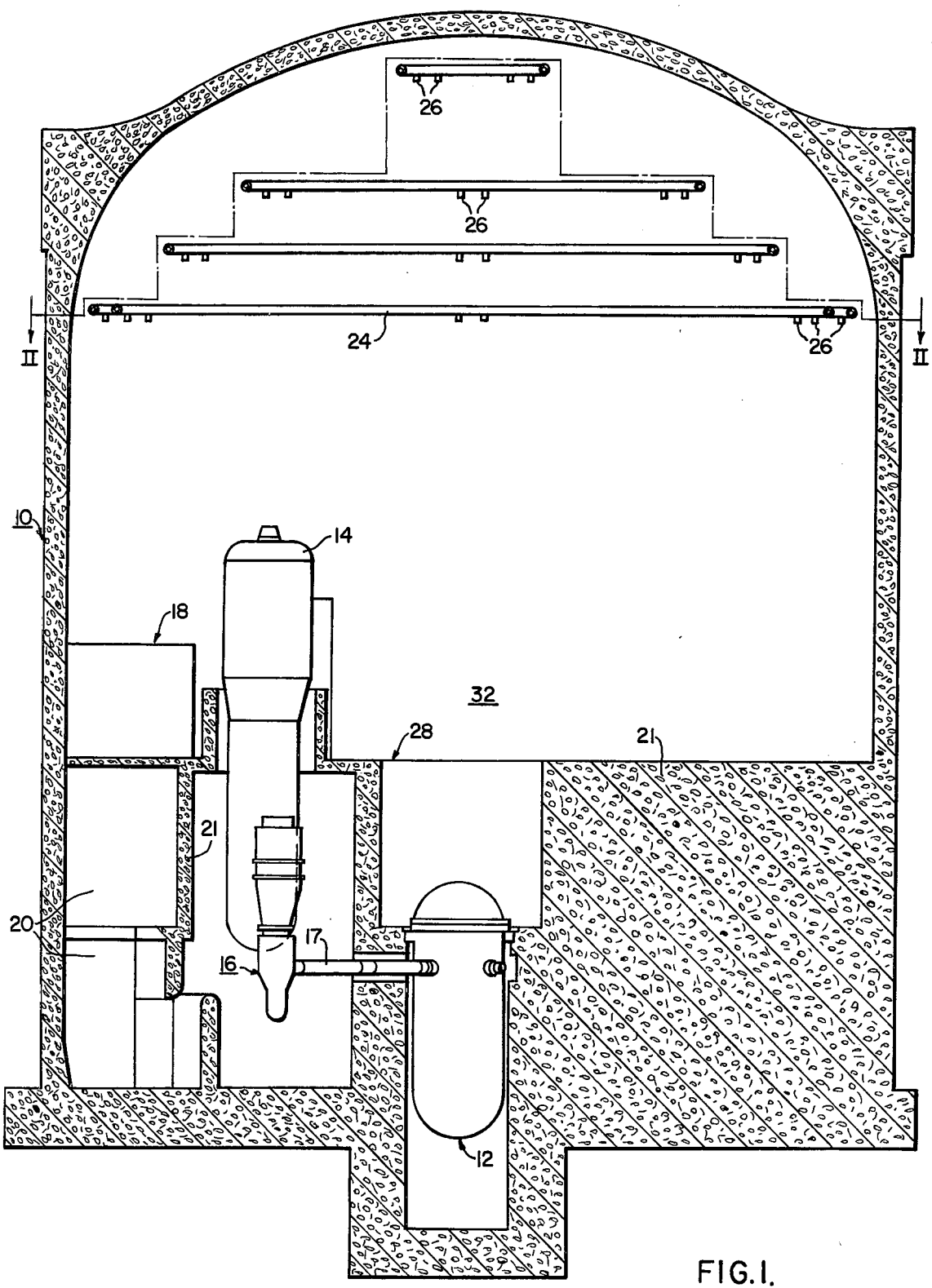
FIG. 1 is a simplified elevation view, in cross section, of a typical nuclear containment building and internal components.

The invention is initially described by reference to the figures. FIG. 1 shows a typical concrete and steel lined reactor containment building 10, housing the reactor primary components. These components include a reactor vessel 12, a steam generator 14, a primary coolant pump 16 and primary piping 17. Also shown is a containment cooling unit 18, compartments 20 for other apparatus separated by concrete shielding 21, and the spray system flow conduits 24 and nozzles 26 of the containment spray system. The containment is a large structure, in the range of 200 feet high and 150 feet in diameter. The spray system conduits 24 are approximately 100 to 150 feet above the operating deck 28, the location where most personnel are situated during maintenance and refueling operations.

Figure 2:
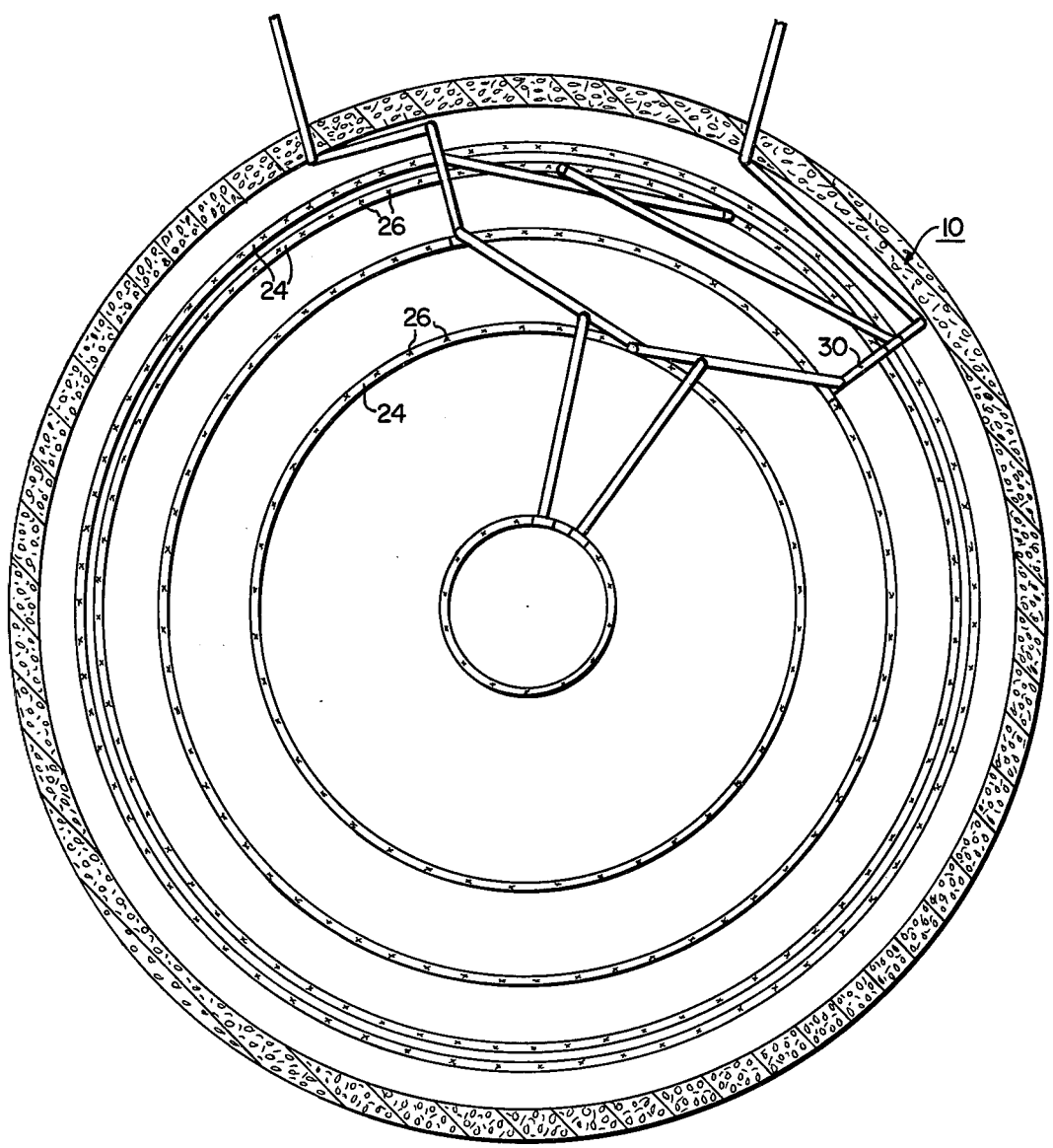
FIG. 2 is a partial plan view, taken at II—II of FIG. 1.
Figure 3:
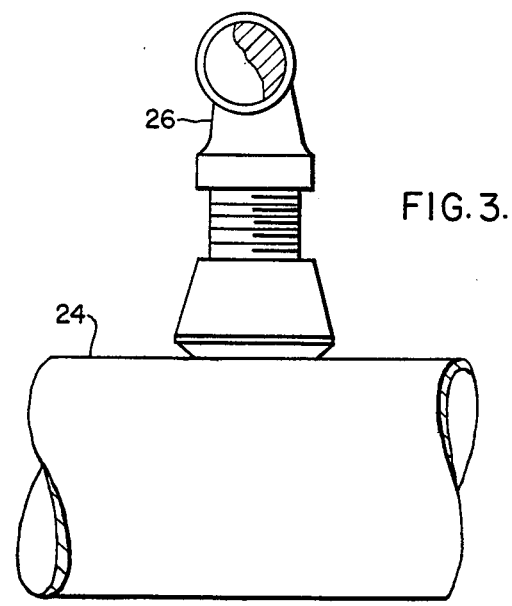
FIG. 3 is an elevation view of a typical spray nozzle connected to the spray system flow piping.

FIG. 2 shows a typical arrangement of the conduits 24 and nozzles 26, as well as the connecting lines 30 of the containment spray system. The flow conduits 24 are typically 4 to 8 inches in diameter, and a spray system comprises hundreds of spray nozzles 26. A typical nozzle is shown in FIG. 3. The containment spray system is one of many auxiliary systems in a nuclear plant that are to operate only under specific accident conditions. All such systems, however, must be tested prior to initial plant operation and at specified intervals during plant life.

The spray system will operate in the unlikely event of a rupture of the reactor primary system, such as the piping 17. Under such conditions a large volume of high temperature reactor coolant is exposed to the internal containment atmosphere 32. The coolant will then flash to vapor, significantly increasing the pressure within the containment 10. The spray system functions to quench this pressure transient, and deluge the lower portions of the containment 10 with the sprayed medium. It also serves to remove radioactive particulates from the containment atmosphere. Spraying a liquid into the containment 10 for testing purposes has obvious drawbacks, and therefore alternative testing techniques are used.

Figure 4:
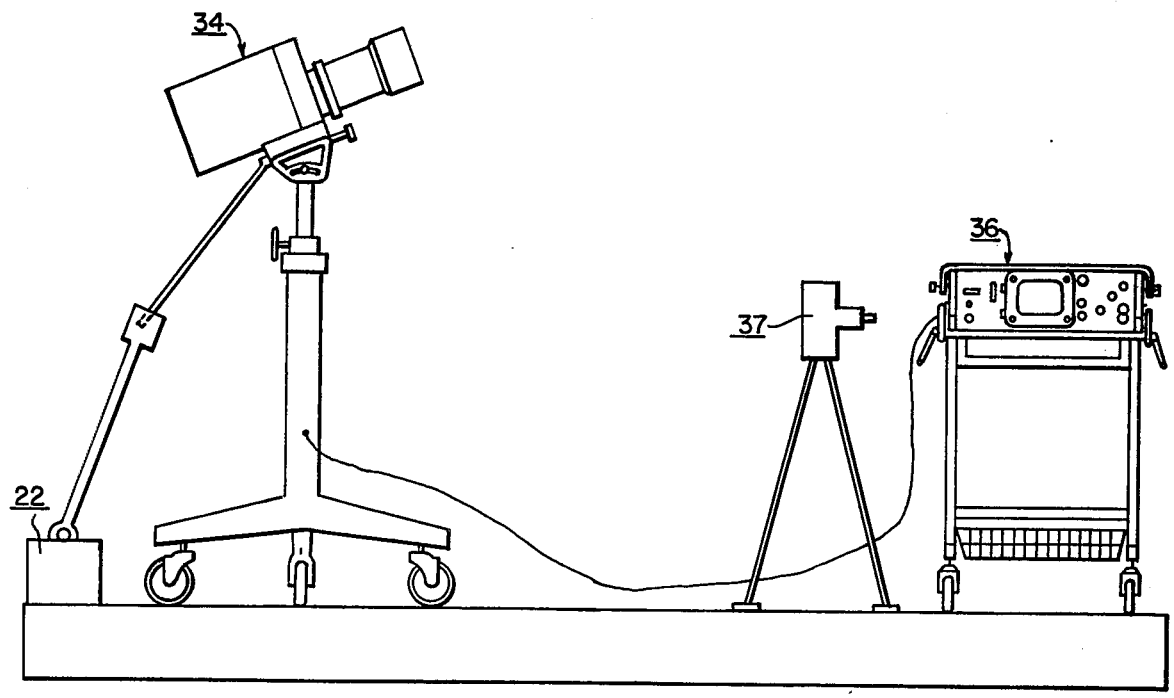
FIG. 4 is a simplified schematic illustrating the operation of one embodiment disclosed.

The test methods disclosed herein are more simple, safer, and much more accurate than prior art methods. The disclosed invention is based upon the ability of existing infrared apparatus to accurately detect and focus on thermal differentials in a gaseous medium such as air. Such apparatus can be portable, and simply operated, such as the commercially available AGA thermovision camera and detector units. Such apparatus 34 weigh in the range of 5 pounds, and can focus on thermal patterns well within the range of a typical containment height. Such apparatus can simply be set up on the operating deck 28, or elsewhere within a containment 10, and focus on the spray nozzles 26 of a containment spray system. This is illustrated in FIG. 4. Variable positioning of the apparatus 34 can be accomplished by automatic positioning means well known in the art and designated by reference numeral 22, or, if desired, manually.

Utilizing such apparatus, the invention comprises injecting a gas, at a temperature different than the ambient temperature of the containment atmosphere, into the spray system. As the gas is discharged from the spray nozzles 26, the infrared detection apparatus 34 is focused on the discharged gas jet. The display unit, such as a cathode ray tube monitor 36 accurately shows the gas jet as a real-time thermal image. A totally blocked nozzle 26 will show no jet exiting the nozzle, while a partially blocked nozzle will show a smaller and distorted gas jet. A comparison of the thermal images obtained from scanning a plurality of nozzles 26 will distinctly point out any flow blockage problems in the containment spray system. Any necessary maintenance can then be performed. The gas is preferably purified, before injection, to remove any particulates which themselves could block the spray system or, subsequent to discharge from the nozzles, could put an excessive load on the containment atmosphere cleanup systems.

The greater the difference in temperature between the injected gas and the containment atmosphere, the more discrete the thermal image will be. As cooling the injected gas renders it more dense, such cooling represents the most advantageous use of the invention method. In conjunction with cooling the gas, the containment atmosphere 32 could be heated, although this is not necessary and could cause some discomfort to personnel within the containment 10. Similarly, the injected gas could be heated, either with, or without, cooling the containment atmosphere 32. This cooling could be performed by the containment cooling unit 18. As the internal free volume of the containment is so large, cooling or heating of the atmosphere 32 would be costly, and is not recommended. In addition, presently available infrared camera and detector apparatus are accurate enough to detect a thermal gas jet under conditions contemplated by this invention. Although a smaller temperature differential would provide adequate results, it is suggested that the temperature of the injected gas be at least 20° to 25° F lower than the containment atmosphere. As the temperature of the containment atmosphere is typically in the range of 70° to 100° F, obtaining gas at the required temperature is relatively easy.

This invention further advantageously lends itself to permanent photographic recording of the test data. A photographic tape of the cathode ray tube monitor 36 can easily be made, as shown by apparatus 37. Also, still photographic pictures of the cathode ray tube monitor 36 may be taken to isolate suspect nozzles.

This invention, therefore, provides a method for accurate and simple testing of a containment spray system. It overcomes the relative inaccuracy of prior art systems, and is significantly easier to operate. It also saves a great deal to time, and hence money, and may be used without risk to operating personnel. It will be apparent that many modifications and variations are possible in view of the above teachings. It therefore is to be understood that within the scope of the appended claims, the invention may be practiced other than as specifically described.

I claim:

1. A method for testing a containment spray system in a containment structure of a nuclear reactor plant, said containment structure having an internal containment atmosphere and said spray system comprising spray nozzles flow connected to flow conduits positioned within said atmosphere, said method comprising:
   a. cooling said gas to a temperature at least 20 Fahrenheit degrees less than the temperature of said containment atmosphere;
   b. injecting said cooled gas into said flow conduits such that said gas flows through said conduits to at least some of said nozzles, completely through said some nozzles, and is discharged from each of said some nozzles as a gas jet into said containment atmosphere, each said gas jet being cooler than said atmosphere; and
   c. scanning each said gas jet with an infrared thermal detection device, said device including a real time thermal image producing monitor, whereby a real time thermal image discharge pattern of each said gas jet within said atmosphere is detected as a result of the difference in temperature between each said gas jet and said containment atmosphere.

* * * * *